Patented June 16, 1953

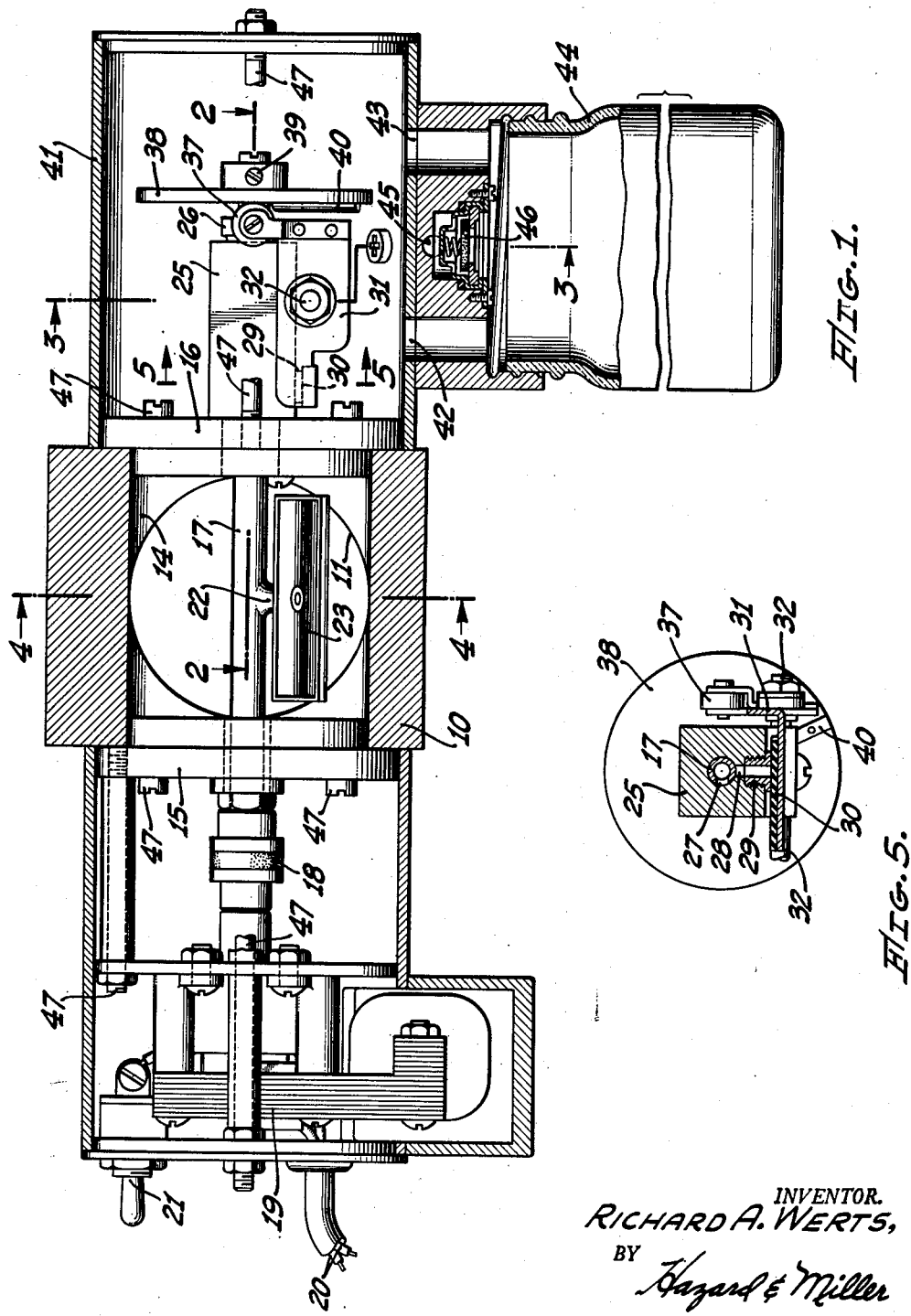

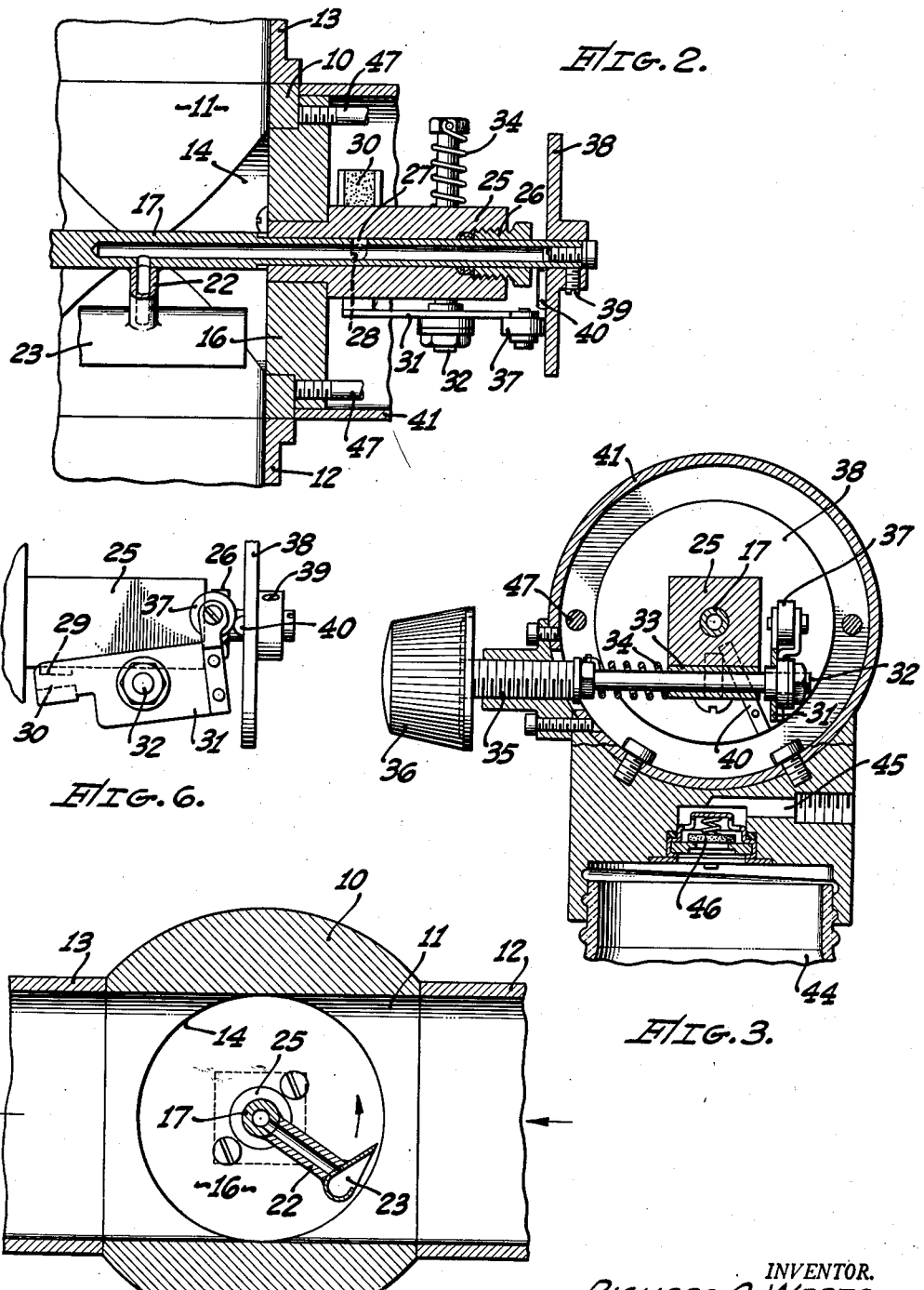

2,641,934

UNITED STATES PATENT OFFICE 2,641,934

AUTOMATIC LIQUID SAMPLER

Richard A. Werts, Long Beach, Calif.

Application October 14, 1949, Serial No. 121,309

7 Claims. (Cl. 73—422)

1

This invention relates to improvements in line samplers wherein it is desired to take a representative sample of a fluid flowing through a conduit.

There are many situations in which the fluid flowing through a conduit tends to stratify, such as is the case where an emulsion of oil and water are being conducted through a conduit. The water constituent will tend to settle to the bottom of the conduit and the oil is supported thereover. In taking representative samples of the fluid flowing through the conduit under these circumstances it is desirable to take samples that will be representative of the fluid from bottom to top in the conduit.

An object of the present invention is to provide a relatively simple inexpensive and highly efficient sampler which is so designed as to take a sample of a fluid flowing through a conduit and which will be representation of the fluid throughout its complete cross section.

Another object of the invention is to provide a sampler consisting essentially of a transversely disposed scoop which extends transversely across the path of fluid flow and which is revolved through a circumference having a diameter which is substantially equal to the diameter of the path of the fluid and wherein provision is made for periodically withdrawing samples of fluid from within the scoop and collecting them.

With the foregoing and other objects in view, which will be made manifest in the following detailed description and specifically pointed out in the appended claims, reference is had to the accompanying drawings for an illustrative embodiment of the invention, wherein:

Figure 1 is a longitudinal vertical section through a line sampler embodying the present invention;

Fig. 2 is a partial view in horizontal section taken substantially upon the line 2—2 upon Fig. 1 in the direction indicated;

Fig. 3 is a vertical section taken substantially upon the line 3—3 upon Fig. 1;

Fig. 4 is a partial view in vertical section taken substantially upon the line 4—4 upon Fig. 1;

Fig. 5 is a vertical section taken substantially upon the line 5—5 upon Fig. 1; and Fig. 6 is a partial view similar to a portion of Fig. 1 but illustrating the outlet valve of the sampler in open position.

Referring to the accompanying drawings wherein similar reference characters designate similar parts throughout, the improved sampler consists of a body 10 having a passage 11 there-

2 through. This body is adapted to be inserted in a conduit or pipe line made up of pipe sections 12 and 13 which may be assumed to be conducting a fluid such as an oil and water emulsion that it is desired to sample. The body 10 is transversely bored as at 14, the transverse bore having a diameter substantially equal to the diameter of the passage 11. The ends of this bore are closed such as by caps 15 and 16 and a hollow shaft 17 is rotatably supported in these caps. This shaft is connected such as by a coupling 18 to a source of rotary power such as is afforded by a small electric motor indicated at 19 and which is supplied with current through conductors 20 that are controlled by means of a switch 21. The hollow shaft 17 carries a radially extending hollow arm 22, the interior of which is in communication with the interior of the shaft and on the outer end of this arm there is disposed a transversely extending scoop 23. This scoop extends a major portion of the distance across the passage 11 and is disposed on the end of the arm so as to sweep fairly close to the walls of the transverse bore 14 in the course of the rotation of the shaft 17 by the motor 19. That end of the shaft 17 which is remote from the motor extends through a bushing 25 that is mounted on the cap 16. A stuffing box 26 on the bushing serves to prevent leakage from the transverse bore around the shaft. An outlet aperture 27 is formed in the shaft so as to be located within the housing and a corresponding aperture 28 is formed in the bushing in such a position so as to register with the aperture 27 in the course of the revolution of the shaft 17. At the end of the aperture 28 there may be a valve seat 29 for a valve closure 30 that is carried by a lever 31 that is pivoted at 32 on a pin that extends through a bearing or journal 33 on the underside of the bushing 25. This pin is normally urged to the left as viewed in Fig. 3 by means of a compression spring 34 but its position can be adjusted by means of an adjusting screw 35 having a handle 36. Thus by screwing the adjusting screw 35 inwardly the pin 32 can be forced toward the right as viewed in Fig. 3 against the action of the compression spring 34.

The remote end of the lever carries a roller 37 which is opposed to the face of a disc 38 that is adjustably mounted on the end of the shaft 17 such as by a set screw 39. Spring 34 also acts as a torsion spring which not only urges the valve closure 30 to close but also urges the roller into engagement with the face of the disc. On the face of this disc there is formed or otherwise provided a radially extending cam or rib 40 which is of uniform width. As the shaft 17 rotates, the disc 38 will rotate with it and while the roller 37 is in engagement with the flat surface of the disc the valve closure 30 will remain in closed or seated condition on the valve seat 29. However, once during each revolution of the shaft 17 and consequently the disc 38 the cam or rib 40 will be brought beneath the roller 37 causing the lever 31 to shift from the closed position shown in Fig. 1 into the open position shown in Fig. 6. When the closure has been thus shifted into open position fluid may flow from the interior of the scoop 23 through the hollow arm 22, the hollow shaft 17, and through the apertures 27 and 28 wherever these apertures are in registration with each other. Thus a small sample can be taken from the passage 11 during each revolution of the shaft 17. The adjustment made by the screw 35 in forcing the pivot pin 32 toward the right as viewed in Fig. 3 is effective to shift the lever 31 and its roller 37 outwardly with relation to the axis of the shaft 17 and when the roller is in its outermost position the time that it is engaged by the cam or rib 40 during each revolution is materially shorter than when the roller is in its innermost position and is engaged by the inner end of the cam nearer the center of rotation. In this manner by adjusting the adjusting screw 35 to position the roller 37 radially with respect to the disc 38 enables the opening of the valve 30 to be timed. When the roller is in its outermost position the valve will be opened only a short period of time per revolution of the shaft and consequently only a small sample will be taken for each revolution. Conversely, when the roller 37 is nearer the center of rotation, more time will be required for the cam or rib 40 to pass beneath the roller and consequently the valve will be held open a longer period of time and a larger sample taken. The sample that is released by the opened valve drops to the bottom of a housing 41 in the bottom of which outlets are provided, as indicated at 42 and 43 enabling the sample to drain into a collecting jar 44 that is detachably mounted on the bottom of the housing such as by threads. This jar and its contents may be removed periodically and an empty jar used for replacement purposes to collect additional samples. At the top of the jar a vent passage 45 is provided in the bottom of the housing 41 that is normally closed by a spring-actuated valve 46. This valve permits air in the jar 44 to escape in the course of filling the jar and in the event that the jar becomes completely filled with samples before it is removed and replaced, the overflow can pass through the vent passage. The parts of the sampler are held together in assembled relationship by suitable cap screws and tie rods 47. These are preferably so arranged that the motor 19 can be conveniently removed and replaced. While a variable speed motor 19 could be employed to vary the speed of rotation of the shaft 17 I find it desirable to employ inexpensive motors of different speeds and, when it is desired to alter the speed of rotation of the shaft 17, to make a complete substitution of the motor to give the proper speed of rotation.

The scoop 23 is so arranged that, when at the bottom of transverse bore 14, it faces upstream with relation to the direction of fluid flow and swings upwardly and forwardly thus, in effect, collecting in the scoop a representative sample that will include a part of the fluid that is flowing near the bottom of the conduit. A portion of this fluid is taken with fluid that enters the scoop at other points in the vertical cross section of the fluid path and is withdrawn through the shaft 17 whenever the valve 30 is open and is collected in the jar 44. As the scoop proceeds from its uppermost to its lowermost position the fluid in the scoop that has not completely been emptied therefrom by the taking of the sample may drop out of the scoop or be drawn out of the scoop by the fluid flowing thereby so that when the scoop again reaches its lowermost position it is in a condition to again take a representative sample of the fluid passing through the passage 11. The improved sampler is advantageous in that it not only can be employed in conduits that are filled to capacity with flowing fluid but can also be used in conduits that are only partially filled with flowing fluid.

From the above described construction it will be appreciated that an improved line sampler is provided that will permit of the taking of a succession of truly representative samples of the fluid flowing through the conduit and their removal from the conduit and collection in a collecting jar 44. Furthermore, the quantity of sample taken during each revolution can be optionally varied by adjusting the adjusting screw 35.

The quantity of sample taken can also be varied by increasing or decreasing the speed of rotation of the shaft 17 as above explained, and obviously if the size of the outlet aperture is varied the quantity taken during each revolution will be varied accordingly.

Various changes may be made in the details of the construction without departing from the spirit and scope of the invention as defined by the appended claims.

I claim:

1. A line sampler comprising a body having a passage therethrough adapted to be inserted in a pipe line or similar conduit, a hollow shaft rotatably mounted in the body, an arm on the shaft, a scoop on the arm extending transversely of the passage, there being a passage in the arm establishing communication between the scoop and the interior of the shaft, means for rotating the shaft to cause the scoop to traverse the passage, and means for collecting samples conducted from the scoop through the arm and shaft.

2. A line sampler comprising a body having a passage therethrough adapted to be inserted in a pipe line or similar conduit, a hollow shaft rotatably mounted in the body, an arm on the shaft, a scoop on the arm extending transversely of the passage, there being a passage in the arm establishing communication between the scoop and the interior of the shaft, means for rotating the shaft to cause the scoop to traverse the passage, an outlet aperture in the shaft, means providing an aperture adapted to register therewith periodically during each rotation of the shaft, means for opening and closing the last mentioned aperture, and means for collecting samples which issue from the last mentioned aperture when it is open.

3. A line sampler comprising a body having a passage therethrough adapted to be inserted in a pipe line or similar conduit, a hollow shaft rotatably mounted in the body, an arm on the shaft, a scoop on the arm extending transversely of the passage, there being a passage in the arm establishing communication between the scoop and the interior of the shaft, means for rotating the shaft to cause the scoop to traverse the passage, an outlet aperture in the shaft, means providing an aperture adapted to register therewith periodically during each rotation of the shaft, means for opening and closing the last mentioned aperture, said means being adjustible to vary the length of time that it is open for the egress of samples, and means for collecting the samples.

4. An automatic liquid sampler comprising a body having a passage therethrough adapted to be inserted in a pipe line, a hollow shaft extending transversely across said body, a hollow arm on the shaft, a scoop on the arm, there being an opening in said scoop and said shaft, respectively, for providing communication between said scoop and shaft through said hollow arm, means for rotating the shaft causing the scoop to traverse the passage, said hollow shaft having an outlet therefrom exteriorly of the body, and means actuated by said shaft during its rotation for periodically opening and closing said outlet once per revolution of the shaft.

5. An automatic liquid sampler comprising a body having a passage therethrough adapted to be inserted in a pipe line, a hollow shaft extending transversely across said body, a hollow arm on the shaft, a scoop on the arm, there being an opening in said scoop and shaft, respectively, for providing communication between said scoop and shaft through said hollow arm, means for rotating the shaft causing the scoop to traverse the passage, said hollow shaft having an aperture therein exteriorly of the body, means surrounding the apertured portion of the shaft having an aperture with which the aperture on the shaft may move into and out of registration as the shaft rotates, and means operable in synchronism with the rotation of the shaft for periodically opening and closing the last-mentioned aperture.

6. An automatic liquid sampler comprising a body having a passage therethrough adapted to be inserted in a pipe line, a hollow shaft extending transversely across said body, a hollow arm on the shaft, a scoop on the arm, there being an opening in said scoop and shaft, respectively, for providing communication between said scoop and shaft through said hollow arm, means for rotating the shaft causing the scoop to traverse the passage, said hollow shaft having an aperture therein exteriorly of the body, means surrounding the apertured portion of the shaft having an aperture with which the aperture on the shaft may move into and out of registration as the shaft rotates and a valve normally closing the last-mentioned aperture, and means operable by the rotation of the shaft for periodically opening and closing said valve.

7. A line sampler comprising a body adapted to be inserted in a conduit conducting fluid, rotary means extending across the body in the path of fluid flow therethrough, there being a passage in said rotary means from the exterior of said rotary means within the body to the exterior of the body, means for rotating said rotary means, there being an aperture in said rotary means exteriorly of the body, means surrounding said rotary means exteriorly of the body having an aperture located therein and adapted to communicate with the aperture in the rotary means when the latter is brought into and out of register, a valve for controlling the first-mentioned aperture, a rib on the rotary means rotatable therewith, and valve actuating means operable by said rib to open and close the valve once per revolution of the rotary means, said valve actuating means being adjustable toward and away from the center of rotation of the rib so that the period that the valve is open can be varied.

RICHARD A. WERTS.

References Cited in the file of this patent

UNITED STATES PATENTS

| Number | Name | Date |
|---|---|---|
| 455,733 | Bell | July 14, 1891 |
| 1,847,395 | Watts | Aug. 30, 1932 |
| 1,964,270 | Nidever et al. | June 26, 1934 |
| 2,091,613 | Polston | Aug. 31, 1937 |
| 2,140,920 | Myracle | Dec. 20, 1938 |
| 2,240,888 | Hageline | May 6, 1941 |
| 2,272,313 | Waters | Feb. 10, 1942 |
| 2,327,123 | Morse | Aug. 17, 1943 |

FOREIGN PATENTS

| Number | Country | Date |
|---|---|---|
| 433,433 | Germany | Aug. 31, 1926 |